United States Patent

[11] 3,586,965

[72] Inventors Dale C. Whysong
Falls Church;
John F. Walton, McLean, both of, Va.

[21] Appl. No. 865,741
[22] Filed Oct. 13, 1969
[45] Patented June 22, 1971
[73] Assignee General Kinetics, Inc.
Reston, Va.

[54] APPARATUS FOR TESTING AND EVALUATING A MAGNETIC MEDIUM FOR DEFECTS
10 Claims, 6 Drawing Figs.

[52] U.S. Cl. ........ 324/34 R, 179/100.2 B, 324/34 TA, 340/174.1 B
[51] Int. Cl. ........ G01r 33/12
[50] Field of Search ........ 324/34, 34 T; 179/100.2 B; 340/174.1 B

[56] References Cited

UNITED STATES PATENTS 2,793,344 5/1957 Reynolds ........ 324/34 TA
2,854,624 9/1958 Lubkin et al ........ 324/34 TA

*Primary Examiner*—Edward E. Kubasiewicz
*Assistant Examiner*—R. J. Corcoran
*Attorney*—Cushman, Darby & Cushman

ABSTRACT: Apparatus for testing and evaluating a magnetic recording medium having a plurality of data tracks thereon wherein the apparatus significantly reduces the number of electronic circuits heretofore required to accomplish the complete testing of such mediums and wherein the apparatus provides two channels. One channel is associated with a reference or clock track while the other channel is associated with the remaining tracks on the medium. A separate transducer head is provided for each of the individual tracks and predetermined pairs of the transducer heads other than the reference transducer heads are connected in electrical parallel and opposing relationship whereby the apparatus indicates the presence of defects in the medium in any one of the tracks without the necessity of supplying a separate channel for each track.

INVENTORS
DALE C. WHYSONG
JOHN F. WALTON

BY Cushman, Darby & Cushman
ATTORNEYS

INVENTORS
DALE C. WHYSONG
JOHN F. WALTON

BY Cushman, Darby & Cushman
ATTORNEYS

INVENTORS
DALE C. WHYSONG
JOHN F. WALTON
BY
Cushman, Darby & Cushman
ATTORNEYS

APPARATUS FOR TESTING AND EVALUATING A MAGNETIC MEDIUM FOR DEFECTS

The present invention relates to testing apparatus and more particularly to apparatus for testing and evaluating multiple track magnetic tapes.

Heretofore, it has been the practice in evaluating magnetic recording mediums for defects to initially write on each of the several parallel information tracks and then read back the information from each track utilizing separate channels for each of the tracks located on the magnetic medium. Although such devices have served the purpose, they have not proved entirely satisfactory since previously existing systems have required at the very minimum a separate electronic amplifier and a separate amplitude detector for each track of the magnetic tape. For example, a seven-track format tester would employ seven preamplifiers, seven amplifiers, and seven amplitude detectors to result in a very expensive machine.

Accordingly, the general purpose of this invention is to provide apparatus for testing and evaluating magnetic recording mediums which embraces all the advantages of similarly employed prior art testing devices while attaining the same result with a significant reduction in the number of electronic circuits required. The apparatus of this invention, furthermore, produces no adverse effects as a result of the significant reduction in the number of electronic components and also provides for a far more inexpensive device.

An object of the present invention is the provision of an inexpensive device for testing and evaluating magnetic recording mediums.

Another object is to provide apparatus for testing magnetic tapes wherein the number of electronic components required to accomplish the complete testing is significantly less than the number of components heretofore required in prior art testing devices.

Other objects and features of the invention will become apparent to those of ordinary skill in the art as the disclosure is made in the following description of a preferred embodiment of the invention as illustrated in the accompanying drawings in which.

Figure 1:
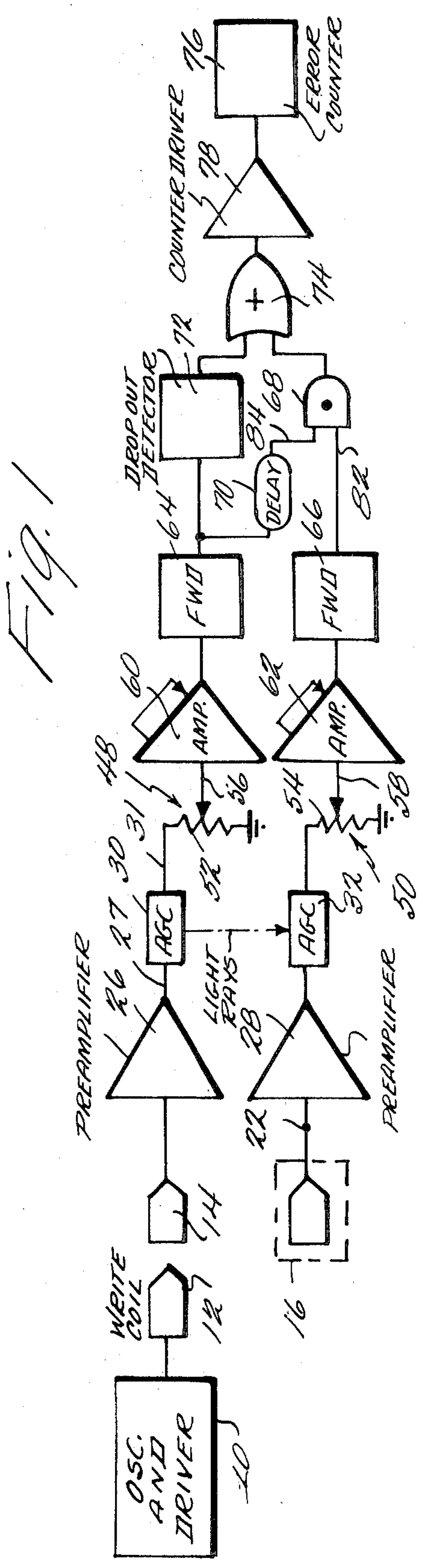
FIG. 1 is a diagrammatic view of a preferred embodiment of the invention.

With reference now to the drawings, wherein like reference characters designate like or corresponding parts throughout the several views, there is shown in FIG. 1 an oscillator and drive circuit 10 coupled to a write coil or transducer head 12, which in fact, may include a plurality of separate heads for simultaneously recording identical signals on each of a plurality of tracks located on a magnetic recording medium or tape. A reference transducer head 14 is provided to be positioned over one of the data tracks of the tape and preferably over the most centrally located track on the tape in order to avoid to the greatest extent possible error caused by skewing of the tape as it is passed under the transducer head.

Figure 2:
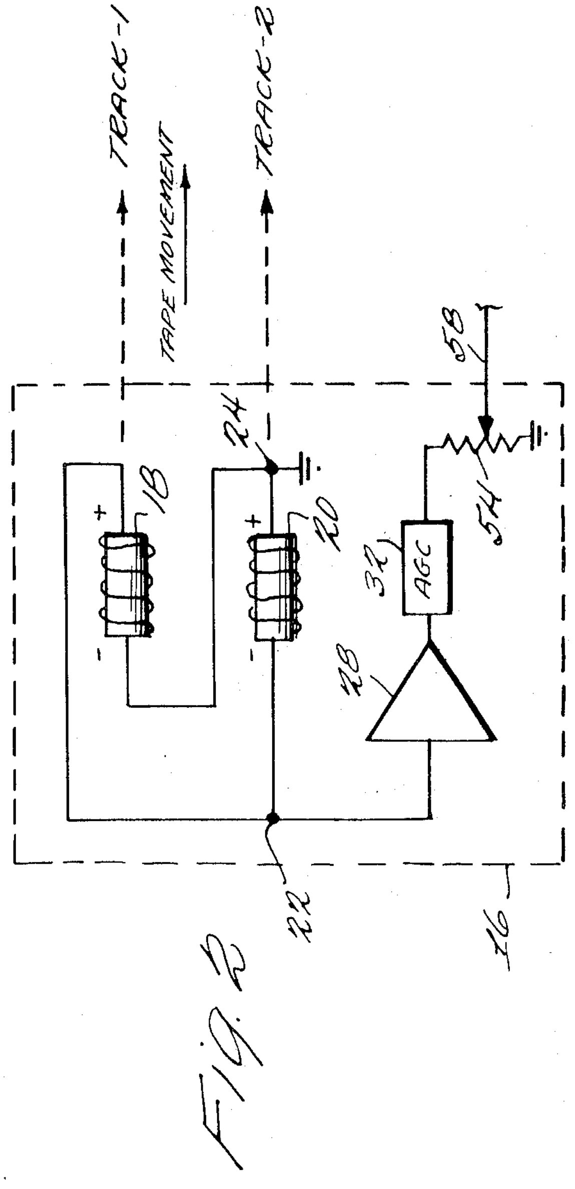
FIG. 2 is a partial schematic illustration of the parallel opposing transducer head arrangement.

In addition, a plurality of additional transducer heads are located at 16 wherein predetermined pairs of these heads are connected in electrical parallel and opposing relationship and wherein these pairs are associated, as nearly as possible, with adjacent tracks on the medium. An example of this arrangement is illustrated in more detail in FIG. 2 wherein, for the purpose of explanation, only two conventional transducer heads 18 and 20 are shown with each positioned over a respective one of the adjacent tracks 1 and 2. These transducer heads with the coils associated therewith act as the secondaries of a transformer and as the signal recorded on the tracks are sensed by the transducer heads the resultant voltage and current between terminals 22 and 24 will be zero when the signals on the tracks 1 and 2 are equal in amplitude and identical with respect to each other in phase. This connection of the transducer heads 18 and 20 is a parallel and opposing configuration.

The first channel associated with the reference transducer head 14 and the second channel associated with the pairs of transducer heads at 16 include preamplifiers 26 and 28, respectively, which are coupled to automatic gain control means 30 and 32, respectively.

Figure 3:
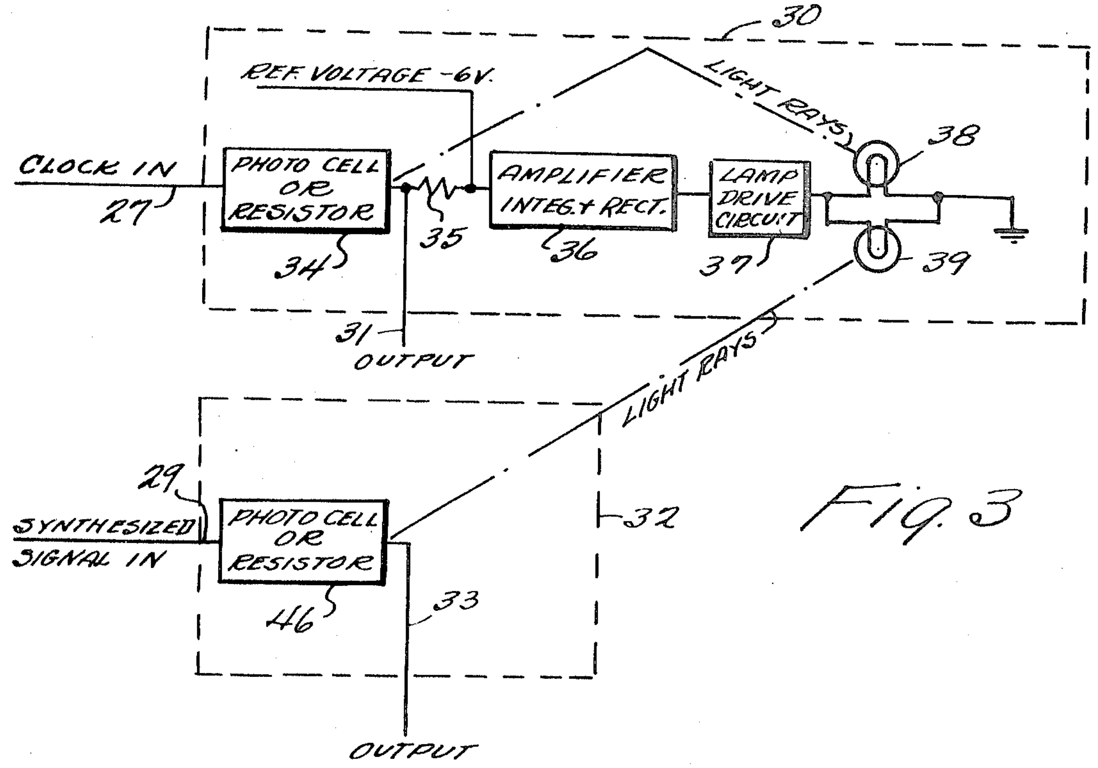
FIG. 3 is a block diagram view showing the automatic gain control components of the system in more detail.
Figure 6:
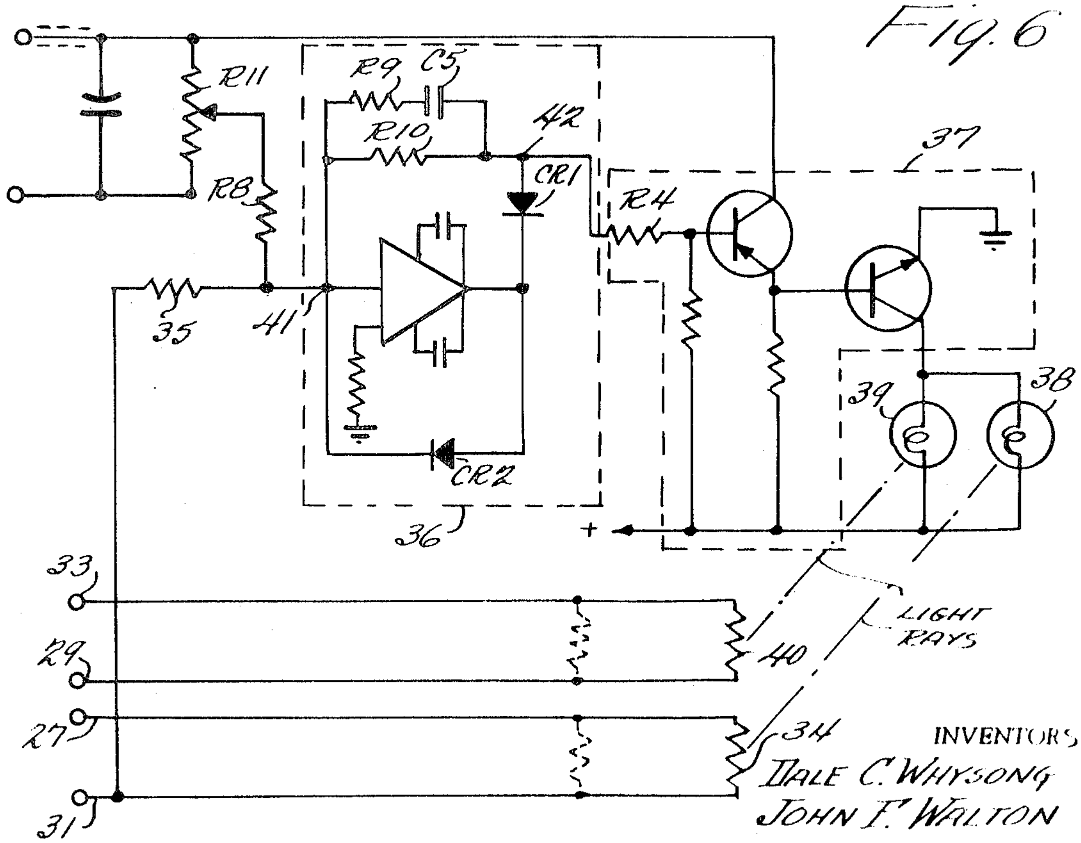
FIG. 6 is a schematic view of the automatic gain control.

The automatic gain control means 30 and 32 are shown in more detail in FIGS. 3 and 6 and the automatic gain control 30 includes a photoresistor 34 having input 27 and output 31. The output of photoresistor 34 is coupled to resistor 35 and a negative DC reference voltage is coupled between resistor 35 and amplifier-rectifier-integrator 36, the output of which is in turn, coupled to lamp drive circuit 37. Lamps 38 and 39 are coupled to the drive circuit and are oriented to direct light onto photoresistor 34 and onto photoresistor 40, respectively.

Since tape does not run at constant speed the amplitude of the read signal is not constant. Thus, without long term constant amplitude it would not be possible to maintain a given signal dropout threshold.

The automatic gain control is provided to accept the output signals of both preamplifiers 26 and 28, that is, the amplified clock track signal and the amplifier synthesized signal, and produce therefrom signals of constant amplitude over periods of 50 ms. or greater, for example. Each of the signals pass through a photoresistor, the resistance of which is governed by illumination from a control lamp. The signal coming through the first or clock channel photoresistor 34 is sampled (because it is a continuous normal read signal) and summed with a DC signal by operational amplifier 36. The amplifier is made to perform simultaneously summation, rectification, and integration. Because of the minus DC input through R8 from R11 to the summing junction 41 of the operational amplifier, the output of the amplifier is positive. The positive output of the amplifier is clamped at a selected voltage by feedback diode CR2. When the peak positive swing of the AC input exceeds a predetermined value (dependent on the setting of R11) the current at the summing junction 41 (the amplifier current feedback to its input) reverses to become positive. The amplifier output then momentarily swings negative resulting in a charge being stored in capacitor C5. The time constant of C5 and R10 may be set at 270 microseconds so that the charge on C5 does not change very much before the next peak is detected 16.6 microseconds later. The output of this circuit at the common junction 42 of C5, CR1, R10, and R4 is therefore negative when the peak signal value of the output side of photoresistor 34 exceeds a threshold value determined by R11. As this output becomes more negative, the lamp drive circuit 37 supplies less power to the control lamps 38 and 39 and, consequently the resistance of the photoresistors 34 and 40 is increased to the point where the output signal on lines 31 and 33 just causes peak value detection at the preset level.

The second or synthesized channel signal going through photoresistor 40 has its control slaved to the clock channel control since it normally consists of only a small cancellation residue signal and would only have a significant controlling amplitude when a single channel continuous dropout is occurring, a calibrate condition but not a normal operating condition.

The outputs 31 and 33 from the automatic gain control means are respectively coupled to potentiometers 48 and 50, which include resistors 52 and 54 and wiper arms 56 and 58. Feedback amplifiers 60 and 62 are respectively coupled to the wiper arms 56 and 58 and the outputs therefrom are coupled to full wave detectors 64 and 66, respectively.

Gating means 68, which is preferably an AND gate, is coupled to the output of full wave detector 66 and through delay means 70 to the output of full wave detector 64. The delay means 70 may be any one of a number of conventional delay devices such as a one-shot multivibrator.

The output from full wave detector 64 is also coupled to dropout detector 72, which may be conventional unijunction oscillator that is characterized by providing an output signal when no input signal thereto is received and by providing no output signal when an input signal is received thereby. The outputs of gating means 68 and of the dropout detector 72 are coupled to OR gate 74 and an error counter 76 is coupled to the output thereof via counter driver means 78.

Although not completely illustrated, it is important in the parallel connections of the transducer heads to couple heads adjacent to one another in opposing relationship with respect to one another. For example, in FIG. 2 heads 18 and 20 are illustrated as being coupled in parallel and opposing relationship with respect to one another and they are located with respect to adjacent tracks 1 and 2. Similarly, additional transducer heads (not shown) positioned over additional tracks of the magnetic tape, if any, are preferably coupled so that transducer heads are connected in such parallel and opposing relationship and, in turn, are coupled to the terminals 22 and 24 in a manner similar to that illustrated with respect to the heads 18 and 20.

Figure 5:
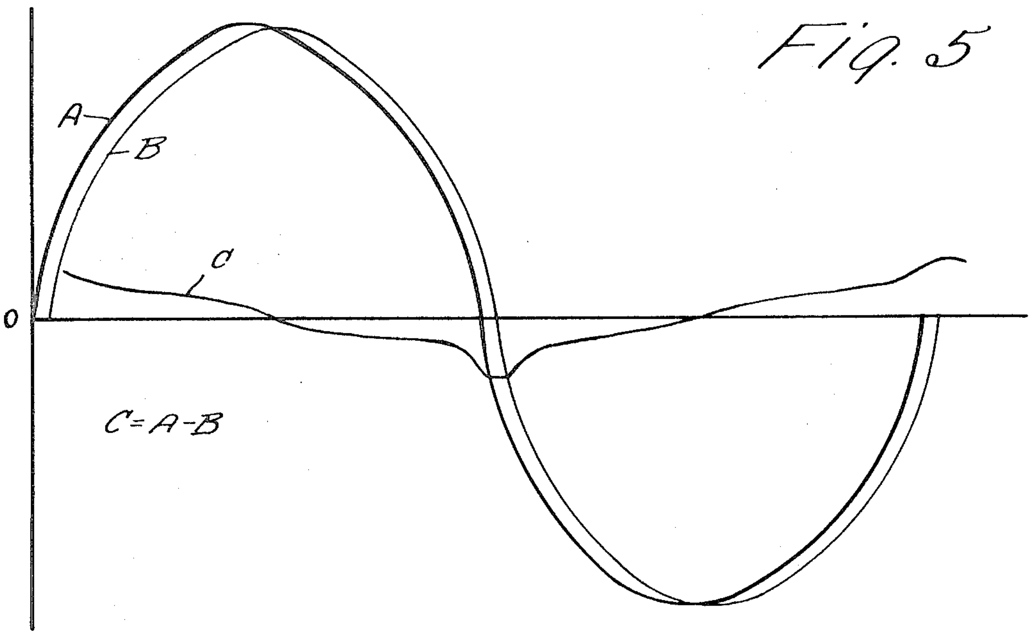
FIG. 5 is a wave shape diagram of the signals present on tracks 1 and 2 of the magnetic tape, for example, with the differences between these signals also being illustrated.

This arrangement is preferably for the optimum operation of the system and FIG. 5 graphically illustrates the advantages of such an arrangement of transducer heads.

FIG. 5 shows signals A and B which represent the signals recorded on tracks 1 and 2 of the magnetic tape. The signal C represents the difference in amplitude over a period of time between the signals A and B. Although the write coil 12 simultaneously recorded identical signals A and B onto the tracks 1 and 2 of the magnetic tape a perfect summing of the signal across terminals 22 and 24 in FIG. 2 seldom, if ever, occurs due to time displacement errors between the signals A and B introduced by geometrical scatter in the individual reading gap positions of the transducer heads and due to slight skewing of the magnetic tape as it moves across the heads. The error due to skewing is less with respect to the signals located on adjacent tracks than it is with respect to signals located on tracks which are farther apart from one another transversely across the tape. Thus, in order to reduce the error due to skewing of the tape to a minimum the summing of the signals on those tracks most nearly adjacent to one another is performed. As can also be seen from FIG. 5 the resultant signal C has its maximum amplitude at the zero crossing points of the signals A and B and a minimum amplitude at the peaks of the signals. The significance of this characteristic of the difference signal C will be discussed in more detail later.

Thus, the write coil 12 records a plurality of identical and substantially transversely aligned signals on each of the tracks of the magnetic tape. In order to test the tape for defects in any one of the tracks the tape is then passed under the transducer heads 14 and 16.

Figure 4:
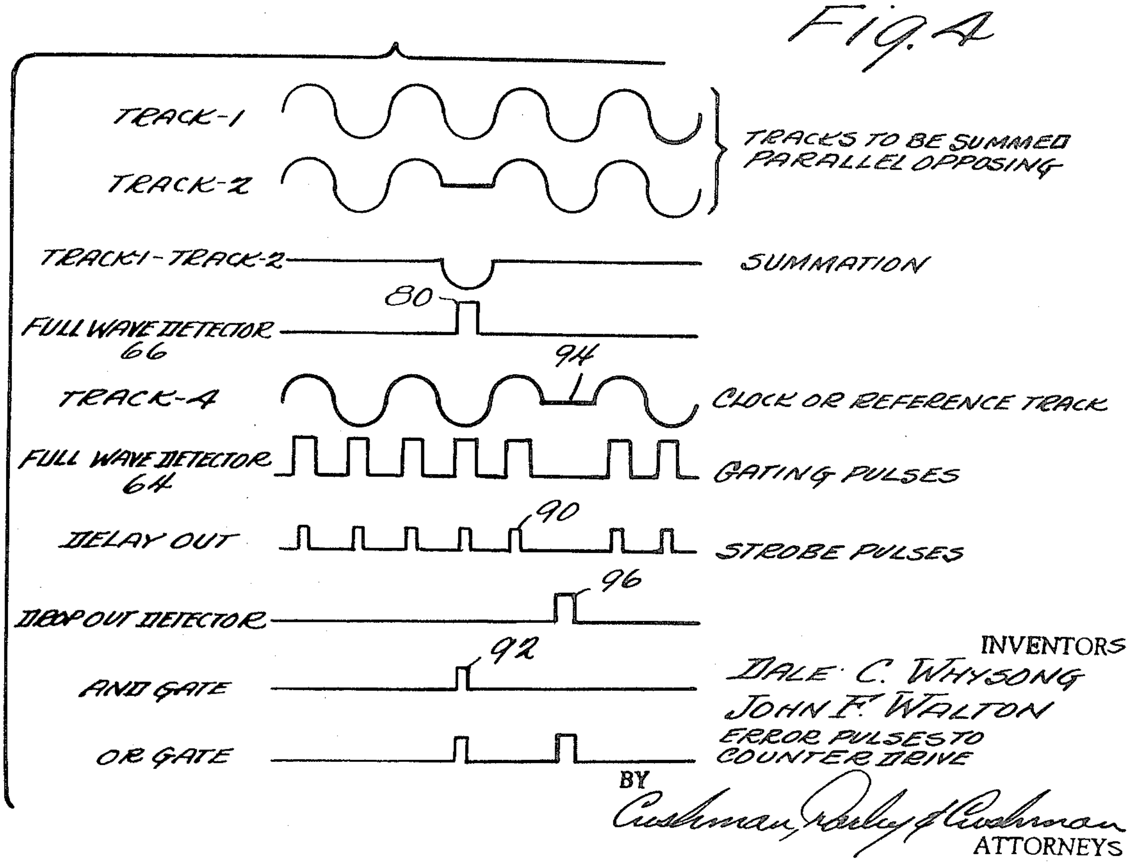
FIG. 4 is a diagram of the wave shapes which are present at various points throughout the apparatus illustrated in FIG. 1.

FIG. 4 illustrates examples of signals which may be present on tracks 1 and 2 as well as on reference track 4. Under normal conditions when no defects in any of the tracks exist and only the slight residual signals, such as signal C in FIG. 5, exist the potentiometer 50 and the full wave detector 66 are set so that no output pluses are produced by the full wave detector 66.

However, if a loss of playback amplitude occurs, as illustrated with respect to the signal on track 2, due to a defect in the respective track, the result at the summation point or terminal 22 will be a large increase in the residual signal as illustrated by the difference signal between tracks 1 and 2 in FIG. 4. This signal is then passed through preamplifier 28, automatic gain control 32, potentiometer 50, and amplifier 62 to the full wave detector 66 which produces an output pulse 80. Thus, the gate 68 has this pulse 80 presented to one of its inputs 82, but since the gate 68 is an AND gate no output therefrom is generated until an input is also received simultaneously at input 84.

This is accomplished in the following manner. The clock or reference track signal is sensed by reference transducer head 14 and is passed sequentially through preamplifier 26, automatic gain control 30, potentiometer 48, and amplifier 60 to the full wave detector 64. The output of this detector is shown in FIG. 4 and consists of a plurality of positive-going pulses which are fed to delay means 70. The delay means, in turn, provides strobe pulses, as shown in FIG. 4, to the gate 68 at times when the amplitudes of the signals on the tape are at a maximum as detected by respective ones of the transducer heads at 16. As a result, the differences in amplitudes of the signals respectively associated with the predetermined pairs of transducer heads as caused by skewing of the tape are at a minimum, as illustrated in FIG. 5, so that the gate 68 is not gated on as a result of skewing of the tape as opposed to defects in the tape so as to give a false indication of the defect in the counter 76. Thus, the output of delay means 70 strobes the gate 68 at times when the amplitude of the signals on the tracks is at a maximum and when the differences between signals on adjacent tracks, as illustrated by signal C in FIG. 5, are at a minimum, so that the gate 68 does not provide an output unless a considerably greater difference signal is provided at the summation terminal 22 than would normally be provided merely as a result of the differences to the signals on adjacent tracks caused by skewing of the tape.

However, when a defect in the tape, such as in track 2, does occur and the input pulses 80 and 90 are present at the inputs of gate 68 an output pulse 92 is produced thereby to pass through the OR gate 74, through the counter driver 78 and to the error counter 76 which records defects in the tape. Thus, the defect in track 2 has been recorded.

In addition, defects may occur in the clock or reference track as illustrated at 94 in FIG. 4. It is also necessary to record these defects and this is done solely through the first channel.

The signal from track 4 is detected by reference transducer head 14 and is fed sequentially through preamplifier 26, automatic gain control 30, potentiometer 48, amplifier 60 to full wave detector 64 which produces a series of pulses as illustrated in FIG. 4. When the defect in the reference track occurs, such as at 94, no pulse is produced by the full wave detector 64. The output of full wave detector 64 is coupled to dropout detector 72 which may be a conventional unijunction oscillator which has a characteristic of producing an output signal when no input signal is received thereby and which produces no output signal when an input signal is received thereby. Accordingly, the output of detector 72 is normally zero as long as the full wave detector 64 continues to provide pulses. But when the detector 64 no longer provides a pulse, as occurs when the defect 94 is present in the reference track, the dropout detector 72 produces a pulse 96 which passes through OR gate 74 and finally to error counter 76 where the presence of the defect is recorded.

It should be understood that the foregoing disclosure relates to only a preferred embodiment of the invention and that numerous modifications or alterations may be made therein without departing from the spirit and scope of the invention as set forth in the appended claims.

What we claim is:

1. Apparatus for testing and evaluating a magnetic recording medium wherein the medium has a plurality of spaced-apart data tracks with substantially aligned signals thereon, said apparatus comprising:

a separate magnetic transducer head adapted to be positioned over each of said tracks for converting said signals to electrical signals, one of said transducer heads being designated as a reference head;

predetermined pairs of said transducer heads other than said reference head connected in electrical parallel and opposing relationship;

a first channel operatively coupled to said reference head for providing a series of strobe pulses;

first gating means for receiving said strobe pulses;

a second channel operatively coupled to said pairs of transducer heads for providing pulses to said gating means when defects in any one of said tracks corresponding to said pairs of transducer heads is sensed by one of said transducer head pairs; and means operatively associated with said first and second channels for counting the number of defects occurring in said data tracks which are associated with said transducer head pairs and with said reference transducer head.

2. Apparatus as in claim 1 in combination with means operatively associated with said medium for recording said substantially aligned signals on said data tracks.

3. Apparatus as in claim 1 wherein said first channel includes first automatic gain control means in circuit with said reference head and wherein said second channel includes second automatic gain control means in circuit with said pairs of transducer heads, said first and second automatic gain control means being in operative relationship with respect to each other to enable said first automatic gain control means to control the operation of said second automatic gain control means.

4. Apparatus as in claim 3 wherein said first and second channels each further include:

potentiometer means coupled to respective ones of said automatic gain control means;

full wave detectors adjustably set to provide electrical output pulses when the inputs thereto reach a predetermined value; and amplifier means respectively coupled between each of said potentiometer means and each of said full wave detectors;

said potentiometer means each being adjustable to determine at what fraction of the maximum amplitude of the output signal from said amplifier means said full wave detector will produce output pulses.

5. Apparatus as in claim 4 further including:

delay means coupled between the full wave detector of said first channel and said gating means for providing said strobe pulses to said gating means at times when the amplitudes of the said signals on said medium are at a maximum as detected by respective ones of said transducer heads whereby the difference in amplitudes of said signals respectively associated with said predetermined pairs of transducer heads as caused by skew of said medium, for example, are at a minimum so that said gating means is not gated on as a result of skew of said medium as opposed to defects in said medium and a false indication of a defect in said medium is not registered in said counter means.

6. Apparatus as in claim 5 wherein said counter means includes:

dropout detector means coupled to said first channel full wave detector for producing output pulses only in the absence of input pulses thereto from said first channel full wave detector whereby an output pulse is produced by said dropout detector means upon the occurrence of a defect in said reference track;

OR gating means coupled to the outputs of said dropout detector means and the first gating means for providing an output signal whenever a signal is produced by said dropout detector means representing the occurrence of a defect in said medium on said reference track or whenever a signal is produced by said first gating means representing the occurrence of a defect in said medium on one or more of said other tracks;

a counter; and counter driver means coupled between said OR gating means and said counter;

said counter registering the occurrence of defects in said medium in any one of said data tracks.

7. Apparatus as in claim 6 wherein said first gating means is an AND gate having its inputs coupled to said second channel full wave detector and to said delay means.

8. Apparatus as in claim 7 wherein each of said channels includes a preamplifier, said first channel preamplifier coupled between said reference transducer head and said first channel automatic gain control means and said second channel preamplifier coupled between said pairs of transducer heads and said second channel automatic gain control.

9. Apparatus as in claim 8 wherein said medium is magnetic tape and wherein said tracks are in substantially parallel relationship with one another.

10. Apparatus as in claim 8 wherein said amplifier means are feedback amplifiers.